United States Patent [19]

Yamada et al.

[11] Patent Number: 5,292,615
[45] Date of Patent: Mar. 8, 1994

[54] OPTICAL RECORDING MEDIUM

[75] Inventors: Takashi Yamada; Fumio Matsui, both of Saitama, Japan

[73] Assignee: Pioneer Electronic Corporation, Tokyo, Japan

[21] Appl. No.: 999,659

[22] Filed: Dec. 29, 1992

Related U.S. Application Data

[63] Continuation of Ser. No. 679,393, Apr. 2, 1991, abandoned.

[30] Foreign Application Priority Data

Oct. 3, 1990 [JP] Japan .................................. 2-265364

[51] Int. Cl.$^5$ .............................................. G11B 7/24
[52] U.S. Cl. .................................. 435/270; 430/495; 430/945; 346/135.1
[58] Field of Search .................. 430/945, 270, 495; 346/135.1

[56] References Cited

U.S. PATENT DOCUMENTS 4,767,693  8/1988  Oba et al. ........................ 430/270
4,873,131  10/1989  Kashima et al. ..................... 428/64

FOREIGN PATENT DOCUMENTS 1-008093  1/1989  Japan .................................. 430/270

*Primary Examiner*—Charles L. Bowers, Jr.
*Assistant Examiner*—John A. McPherson
*Attorney, Agent, or Firm*—Sughrue, Mion, Zinn, Macpeak & Seas

[57] ABSTRACT

An optical recording medium having a recording film which comprises a phthalocyanine type coloring matter and a light absorbing agent having an absorption in the wavelength region corresponding to the laser recording wavelength.

Such an optical recording medium is excellent in light resistance, is capable of providing a clear pit having a neat configuration at the time of recording and is capable of providing a sufficient reproduction characteristic.

7 Claims, 1 Drawing Sheet

EFM SIGNAL

SAMPLE OF THIS INVENTION

EFM SIGNAL

COMPARATIVE SAMPLE

200KHz

SAMPLE OF THIS INVENTION

200KHz

COMPARATIVE SAMPLE

400KHz

SAMPLE OF THIS INVENTION

400KHz

COMPARATIVE SAMPLE

OPTICAL RECORDING MEDIUM

This is a continuation of application Ser. No. 07/679,393, filed Apr. 2, 1991, now abandoned.

FIELD OF THE INVENTION AND RELATED ART

The present invention relates to an optical recording medium, and more particularly to an optical recording medium which has a recording film containing a phthalocyanine type colorant (or coloring matter) as a main component.

In general, an optical recording medium has various distinguishing characteristics such that it has a large memory capacity, and writing and read out operations may be conducted by using it in a non-contact mode. Accordingly, various optical recording media have heretofore been actively developed.

As one of such optical recording media, there is a write once type optical disk. In the disk of this type, a laser beam is focused on a minute area of a recording film, and the beam energy is converted into heat energy to change the property of the recording film (or to form a pit). whereby recording is effected. When such a disk is used, reproduction is effected by utilizing the difference in reflection light quantity between the resultant recorded portion and non-recorded portion.

As the material constituting the recording film of such a medium, it is preferred to use a material which is capable of providing a considerable change in reflectivity. Further, such a material is also required to provide a higher sensitivity and to reduce the production cost. Accordingly, various proposals using a recording film made of an organic material such as colorant (or coloring matter) have been made.

In order to put the colorant of organic material type to practical use as a recording film, the colorant constituting the recording film is required not only to satisfy the above-mentioned characteristics but also to have excellent light resistance and excellent environmental resistance so that deterioration in reproduction caused by readout light is prevented and the data or information is securely stored for a long period of time.

It is well known that a phthalocyanine type colorant is a colorant which is excellent in the above-mentioned light resistance.

However, the phthalocyanine type colorant has a higher decomposition point as compared with those of the other colorants, and shows no absorption with respect to an ordinary recording wavelength region. As a result, when a laser beam is supplied to the recording film using the above-mentioned colorant to form therein a pit, a clear pit having a neat configuration is not formed but the end portion of the resultant pit is fused and fluidized so as to form a configuration containing a tailing portion. As a result, when reproduction is effected on the resultant recording film to produce a reproduction wave-form, a so-called "hump" phenomenon occurs to pose a problem such that a sufficient reproduction characteristic is not obtained.

SUMMARY OF THE INVENTION

Accordingly, a principal object of the present invention is to solve the above mentioned problems and to provide an optical recording medium which is excellent in light resistance, is capable of providing a clear pit having a neat configuration at the time of recording and is capable of providing a sufficient reproduction characteristic.

According to the present invention, there is provided an optical recording medium comprising a substrate and a recording film disposed thereon:

wherein the recording film comprises a phthalocyanine type coloring matter and a light absorbing agent showing an absorption in a wavelength region corresponding to a laser recording wavelength.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1A:
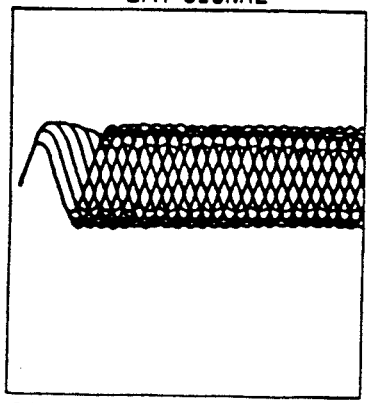
FIGS. 1–3 are graphs respectively showing recording reproduction waveforms corresponding to an EFM signal, and simple harmonic signals (200 KHz and 400 KHz).

A substrate to be used in the present invention can be any conventional one as long as it is light transmissive, but may preferably be a so-called injection-molded substrate in view of improvement realized thereby in productivity. The injection-molded substrate used herein is one which comprises a substrate in the form of a flat plate, and a configuration to be formed on one side surface of the substrate such as groove and address and is integrally molded in one shot by using the same material.

Such a substrate may for example, be formed from a plastic material such as polycarbonate resin (PC) and polymethylmethacrylate resin (PMMA).

In the present invention, a recording film is formed on such a substrate, and the recording film comprises a phthalocyanine type colorant (or coloring matter) as a main component and a light absorbing agent as an additive contained therein showing an absorption in the wavelength region corresponding to the laser recording wavelength.

The above-mentioned phthalocyanine type colorant (dye or pigment) may preferably be one represented by the following general formula (I):

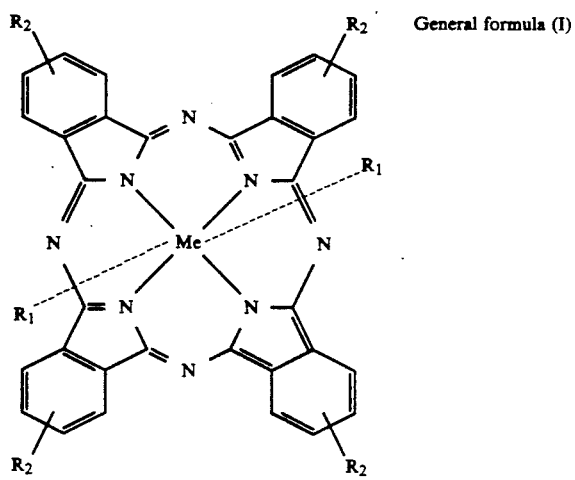

General formula (I)

In the above general formula (I), $R_1$ denotes a linear alkyl group and $R_2$ denotes Cl, $CH_3$, $SO_2$, an aromatic group, and the like, and Me denotes a metal. Me may particularly preferably be Si, V, Fe, Al, and the like.

Further, the recording film used in the present invention contains a light absorbing agent as an additive showing an absorption in the wavelength region corresponding to the laser recording wavelength.

The above-mentioned laser recording wavelength region can be about 760–830 nm. The light absorbing agent having a light absorption characteristic in such a wavelength region may for example be a cyanine colorant (or coloring matter).

The cyanine colorant (dye or pigment) represented by the following general formula (II) may preferably be used:

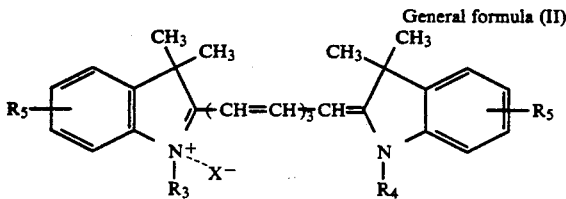

General formula (II)

In the above formula (II), $R_3$ and $R_4$ respectively denote an alkyl group having 1–5 carbon atoms, preferably having 1–3 carbon atoms; and $R_5$ denotes a hydrogen atom or a substitutent capable of replacing it. The substituent may for example be Cl, $CH_3$, a phenyl group, and the like. In the above formula, X denotes a counter ion such as $ClO_4^-$ and $I^-$.

The above groups $R_3$, $R_4$, $R_5$ and $X^-$ may appropriately be selected corresponding to the wavelength of the laser recording wavelength used.

Such a light absorbing agent may preferably be contained in an amount of 5–20 wt. %, more preferably 5–10 wt. %, based on the above phthalocyanine colorant. It the amount of the light absorbing agent is above 20 wt. %, reflection is considerably reduced due to light absorption, and there may be posed a problem such that the resultant playability is lacking. On the other hand, if the amount is below 5 wt. %, there may be posed a problem as in the prior art such that the light recording film comprising the phthalocyanine is fluidized.

The recording film comprising the phthalocyanine type colorant and the light absorbing agent may be formed by coating by using a conventional method such as spin coating. The recording film to be formed by coating may preferably have a thickness of about 40–100 nm. In such a coating method, it is possible to use a solvent such as diacetone alcohol, methyl cellosolve, isophorone methanol, and tetrafluoropropanol.

The laser light to be used in combination with the recording medium according to the present invention may preferably be a semiconductor laser having a wavelength of 760–830 nm, as described hereinabove.

The recording medium according to the present invention may be formed by disposing a recording film on a so-called injection molded substrate as described above. However, it is also possible that the recording medium according to the present invention has a so-called "air sandwich structure" in which two medium sheets of the above type are disposed so that the recording film surfaces are opposed to each other.

In general, recording light in the form of a pulse may be supplied to the recording medium according to the present invention while the medium is rotated. At this time, a portion of the recording film is fused to be removed, whereby a pit is formed therein.

The data corresponding to the thus-formed pit may be read out by detecting a difference in the reflection light corresponding to the reading light under rotation of the recording medium.

The present invention is described in more detail with reference to the following Example.

EXAMPLE

An Al-phthalocyanine was used as the phthalocyanine type colorant to be contained in a recording film. A heptamethine cyanine colorant was used as the light absorbing agent.

These components were dissolved in a solvent comprising ethyl cellosolve and the resultant coating liquid was applied onto a polycarbonate (PC) substrate having a diameter of 13 cm so as to provide a thickness of 60 nm, whereby an optical recording medium according to the present invention (Sample according to the present invention) was prepared. The light absorbing agent was used in an amount of 10 wt. % based on the phthalocyanine colorant.

Then, there was prepared a sample (Comparative Sample) comprising a recording film comprising the phthalocyanine colorant to which no light absorbing agent was added.

With respect to these Samples, recording and reproduction operations were conducted by using an EFM (Eight to Fourteen Modulation) signal, and single-frequency signals (200 KHz and 400 KHz) under the following conditions.

Figure 1B:
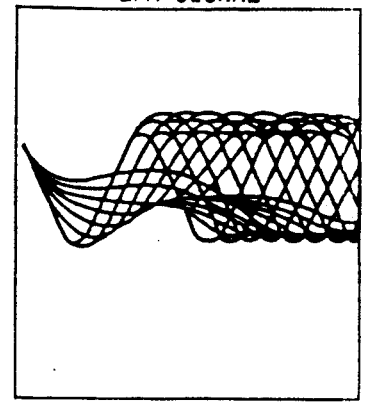
Figure 2A:
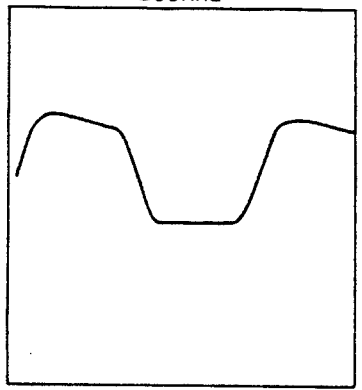
Figure 2B:
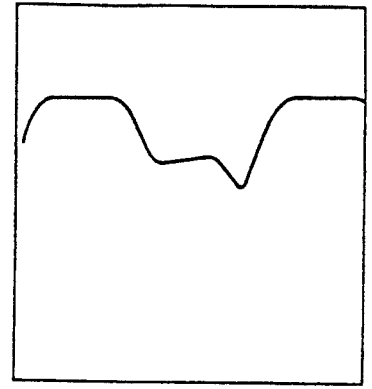
Figure 3A:
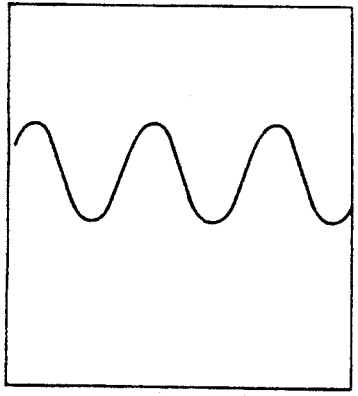
Figure 3B:
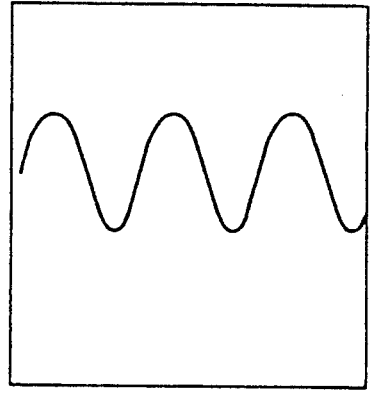

EEM signal recording conditions
Wavelength: 780 nm,
Linear speed: 1.4 m/s,
Reading power: 0.5 mW,
Writing power: 6 mW
Single-frequency signal (200 KHz, 400 KHz)
Wavelength: 780 nm,
Linear speed: 1.4 m/s,
Reading power: 0.5 mW,
Writing power: 6 mW The resultant recording and reproduction waveforms are shown in FIGS. 1–3. In these Figures, FIG. 1(a), FIG. 2(a) and FIG. 3(a) correspond to a case wherein the Sample according to the present invention was used. FIG. 1(b), FIG. 2(b) and FIG. 3(b) correspond to a case wherein the Comparative Sample was used.

With reference to FIG. 1, the Sample according to the present invention provided a regular eye-pattern. Further, as shown in FIGS. 2 and 3, the Sample according to the present invention did not cause a so called "hump phenomenon", and it was confirmed that the pit recorded on the Sample according to the present invention had been formed so as to provide a clear configuration having very little distortion.

Further, various additional Samples were prepared by changing the amount of the light absorbing agent contained in the above-described Sample according to the present invention so as to provide amounts of 2.5 wt. %, 5 wt. %, 10 wt. %, 20 wt. %, and 30 wt. % based on the phthalocyanine type colorant. When these Samples were subjected to the recording and reproduction experiments in the same manner as described above, Samples having a content in the range of 5–20 wt. % provided good results.

As described hereinabove, the recording film of the optical recording medium according to the present invention comprises a phthalocyanine type coloring matter and a light absorbing agent having an absorption in the wavelength region corresponding to the laser recording wavelength. Such an optical recording medium is excellent in light resistance, is capable of providing a clear pit having a neat configuration at the time of recording and is capable of providing a sufficient reproduction characteristic.

What is claimed is:

1. An optical recording medium comprising a substrate and a recording film disposed thereon;

wherein the recording film comprises a phthalocyanine-type coloring matter and a light absorbing agent comprising a polymethine cyanine dye having an absorption in a wavelength region corresponding to a laser recording wavelength, and wherein said light absorbing agent is present in an amount of 5-20 wt % based on the phthalocyanine-type coloring matter, said phthalocyanine-type coloring matter being represented by formula (I):

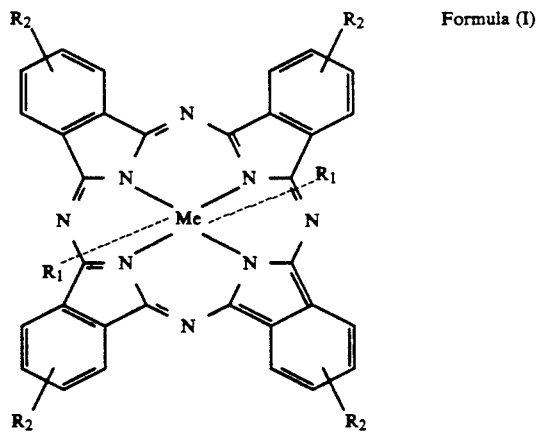

Formula (I)

wherein $R_1$ represents a linear alkyl group, and each $R_2$ represents any one of Cl, $CH_3$, $SO_2$ or an aromatic group, and Me represents a metal atom;

and said light absorbing agent being represented by formula (II):

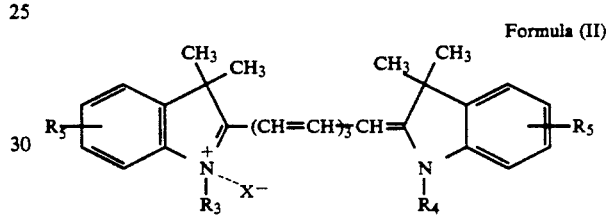

Formula (II)

wherein $R_3$ and $R_4$ each represents an alkyl group having 1-5 carbon atoms, and $R_5$ represents a hydrogen atom or a substituent group, and $x^-$ represents a counter ion.

2. A medium according to claim 1, wherein said light absorbing agent has a light absorption characteristic in the wavelength region of 760-830 nm.

3. A medium according to claim 1, wherein said phthalocyanine type coloring matter comprises an Al (aluminum) phthalocyanine coloring matter.

4. A medium according to claim 1, wherein said light absorbing agent is present in an amount of 5-10 wt % based on the phthalocyanine-type coloring matter.

5. A medium according to claim 1, wherein Me in formula (I) is selected from the group consisting of Si, V, Fe and Al.

6. A medium according to claim 1, wherein at least one $R_5$ in formula (II) is a substitutent group selected from the group consisting of Cl, $CH_3$ and a phenyl group.

7. A medium according to claim 1, wherein said counter ion in formula (II) is selected from the group consisting of $ClO_4^-$ and $I^-$.

* * * * *